United States Patent
Sato

(10) Patent No.: US 6,635,100 B2
(45) Date of Patent: Oct. 21, 2003

(54) NIOBIUM POWDER AND ANODE FOR SOLID ELECTROLYTE CAPACITORS MADE THEREFROM

(75) Inventor: Nobuyuki Sato, Chiba (JP)

(73) Assignee: Kawatetsu Mining Co., Ltd., Tokyo (JP)

( * ) Notice: Subject to any disclaimer, the term of this patent is extended or adjusted under 35 U.S.C. 154(b) by 45 days.

(21) Appl. No.: 10/046,771

(22) Filed: Jan. 17, 2002

(65) Prior Publication Data

US 2002/0134195 A1 Sep. 26, 2002

(30) Foreign Application Priority Data

Jan. 22, 2001 (JP) .......................................... 2001-13363

(51) Int. Cl.$^7$ ................................................. B22E 1/00
(52) U.S. Cl. .......................................... 75/255; 361/528
(58) Field of Search .............................. 75/255; 361/528

(56) References Cited

U.S. PATENT DOCUMENTS

| | | | |
|---|---|---|---|
| 4,141,719 A | 2/1979 | Hakko | 75/255 |
| 4,954,169 A | 9/1990 | Behrens | 75/228 |
| 5,171,379 A | 12/1992 | Kumar et al. | 148/422 |
| 5,680,685 A | 10/1997 | Bischoff | 29/25.42 |
| 6,139,593 A | 10/2000 | Kono | 29/25.03 |
| 6,521,013 B1 * | 2/2003 | Naito et al. | 75/239 |

FOREIGN PATENT DOCUMENTS

| | | |
|---|---|---|
| EP | 0 953 847 A1 | 11/1999 |
| JP | 60 121207 A | 6/1985 |
| JP | 01 073009 A | 3/1989 |
| JP | A 64-73009 | 3/1989 |
| JP | 2000-226607 A | 8/2000 |
| JP | 2000 226607 A | 8/2000 |

* cited by examiner

*Primary Examiner*—Ngoclan Mai
(74) *Attorney, Agent, or Firm*—Oliff & Berridge, PLC

(57) ABSTRACT

A niobium powder for forming an anode of a solid electrolytic capacitor which improves the defects in the prior art that an average particle diameter is too small, niobium is consumed as an oxide film in anodic oxidation step and the effective electrode surface area decreases. In the improved powder, for primary particles, the average particle diameter is 0.10–2 μm, the geometric standard deviation of particle size distribution exceeds 1.4 and the degree of sphericity is 2 or less. Anodes for solid electrolytic capacitors which are suitable for the use of super-high capacity can be manufactured by using the improved powder.

2 Claims, 2 Drawing Sheets

NIOBIUM POWDER AND ANODE FOR SOLID ELECTROLYTE CAPACITORS MADE THEREFROM

BACKGROUND OF THE INVENTION

1. Field of the Invention

This invention relates to a particle size and shape of a niobium powder, and to an anode for a solid electrolytic capacitor made therefrom.

2. Description of the Related Art

In recent years, niobium powder has been attracting an attention as an anode material for a solid electrolytic capacitor having a high electrostatic capacitance.

In the prior art, a niobium powder used for solid electrolytic capacitors has a mean primary particle diameter of 0.011–0.025 µm and a narrow particle size distribution. For example, in Japanese Patent Laid-Open Sho 64-73009, a method is disclosed for manufacturing high purity Ta or Nb powder for a solid electrolytic capacitor. In this method, Ta or Nb is converted to metal halide by halogen gas, and this metal halide is reduced by hydrogen gas to obtain a metallic powder at a reducing temperature of 800–1000° C. The amount of hydrogen gas used is 30–500 times that of Ta or Nb in terms of molar ratio. In the embodiments, only a primary particle diameter of 0.0109–0.249 µm (10.9–24.9 nm) is disclosed for the niobium particles obtained. If such superfine niobium particles are used for the anode of a solid electrolytic capacitor, niobium will be consumed in the anodic oxidation step in which an oxide film as dielectric is formed on niobium. In a certain portion of the niobium, all the niobium will be transformed into niobium oxide. Therefore, the effective electrode surface area decreases, and it becomes difficult to obtain a capacitor of super-high capacity.

In order to prevent this, Japanese Patent Laid-Open 2000-226607 proposes a tantalum or niobium powder wherein the mean particle diameter of primary particles is 50 nm to 150 nm (0.050–0.150 µm), the particle size distribution is a logarithmic normal distribution, and the geometric standard deviation thereof is 1.4 or less. In this technique, using a DC plasma CVD device, tantalum powder or niobium powder is manufactured by introducing a tantalum or niobium halide (general formula: $TaX_5$ or $NbX_5$, where X is a halogen element) or a tantalum or niobium alkoxide (general formula: $Ta(OR)_5$ or $Nb(OR)_5$ where OR is an alkoxyl group) and hydrogen gas to a plasma arc through a second or a third nozzle of a multi-stage plasma torch. The tantalum or niobium halide is thereby reduced by hydrogen to metallic tantalum or niobium powder. With this technique, the niobium consumption in the anodic oxidation step is suppressed by an amount corresponding to the increase in the average particle diameter of primary particles. However, as a powder having a narrow particle size distribution is used, void in the porous body formed by sintering the niobium powder increases, and the packing density becomes smaller.

If a powder having a wide particle size distribution and a mean particle diameter of primary particles of 0.050–0.150 µm is used, the packing density of a porous body will become large. The void in the porous body then becomes small, penetration of the solid electrolyte into the void is poor, and the electrostatic capacitance falls.

In the niobium powder according to the related art, the mean particle diameter of primary particles is small, for example, less than 50 nm (0.050 µm) or 50–150 nm (0.050–0.150 µm). If such a fine niobium powder is sintered to form an anode, some niobium becomes oxide film and is consumed in the anodic oxidation step, and the amount of niobium which is not oxidized decreases. Therefore, the effective electrode surface area decreases, and a capacitor of super-high capacity cannot be obtained. That is, these fine particles are too small to be used for a sintered powder pellet.

SUMMARY OF THE INVENTION

This invention, which resolves the above-mentioned problem, aims to provide a niobium powder suitable for manufacturing an electrolytic capacitor having a high electrostatic capacitance and small dielectric loss tangent, and an anode for a solid electrolytic condenser using this niobium powder. From the applied voltage, the progression angle of the current in the dielectric may be expressed as $(\pi/2)-\delta$. The dielectric loss tangent is tan $\delta$, and both $\delta$ and tan $\delta$ are small values. As the magnitude of the dielectric loss is proportional to tan $\delta$, this value is important as a value representing characteristics of a dielectric substance.

This invention, which was conceived in order to solve the above-mentioned problems, relates to a niobium powder wherein, for primary particles, the average particle diameter is 0.10–2 µm, the geometric standard deviation of particle size distribution exceeds 1.4 and the degree of sphericity is 2 or less.

In this invention, a primary particle means a particle which is regarded as a single particle under SEM microscope observation and which is not agglomerated. The mean particle diameter is the 50% particle diameter of the number of particles. This particle diameter is expressed by the typical diameter of a particle. The geometric standard deviation (number basis) is a value obtained by dividing the value of the 50% particle diameter of the particle number shown by the typical particle diameter, by the value of the 15.87% particle diameter. Herein, the typical particle diameter is the projected circular equivalent diameter (diameter of a circle having the same area as the projected area of a particle), and is also referred to as the Heywood diameter.

The degree of sphericity of a particle can be found by using an image analysis device 1P-1000PC (Asahi Chemical Industry Co., Ltd.) to an image of the particles observed by an electron microscope.

Degree of sphericity=(diameter of circle equal to projected area of particle)/(diameter of smallest circle circumscribed around projected image of particle) (1)

The reason for the numerical limitations of this invention is as follows. When the mean particle diameter of a primary particle is less than 0.1 µm, a solid electrolytic capacitor of high electrostatic capacitance cannot be obtained. On the other hand, when the mean particle diameter exceeds 2 µm, the particle size is too large and sintering does not proceed well, so when compression of powder is carried out, a sintered powder pellet of high strength is not obtained.

The geometric standard deviation is an index which shows the width of the particle size distribution. When it exceeds 1.4, the packing density of powder is large, and void in the porous substance increases, which is desirable. It is required that the geometric standard deviation is greater than 1.4 and less than 2, and preferably greater than 1.5 and less than 2.

When the degree of sphericity exceeds 2, the amount of niobium consumed as an oxide film in the chemical processing step increases compared with the case when the degree of sphericity is two or less than 2.

This invention also provides an anode for electrolytic capacitors formed by sintering the above niobium powder. If a solid electrolytic capacitor is manufactured using a niobium powder having the above characteristics, there is little decrease of electrode surface, and a highly efficient capacitor having a super-high capacitance can be obtained.

DETAILED DESCRIPTION OF A PREFERRED EMBODIMENT

Figure 1:
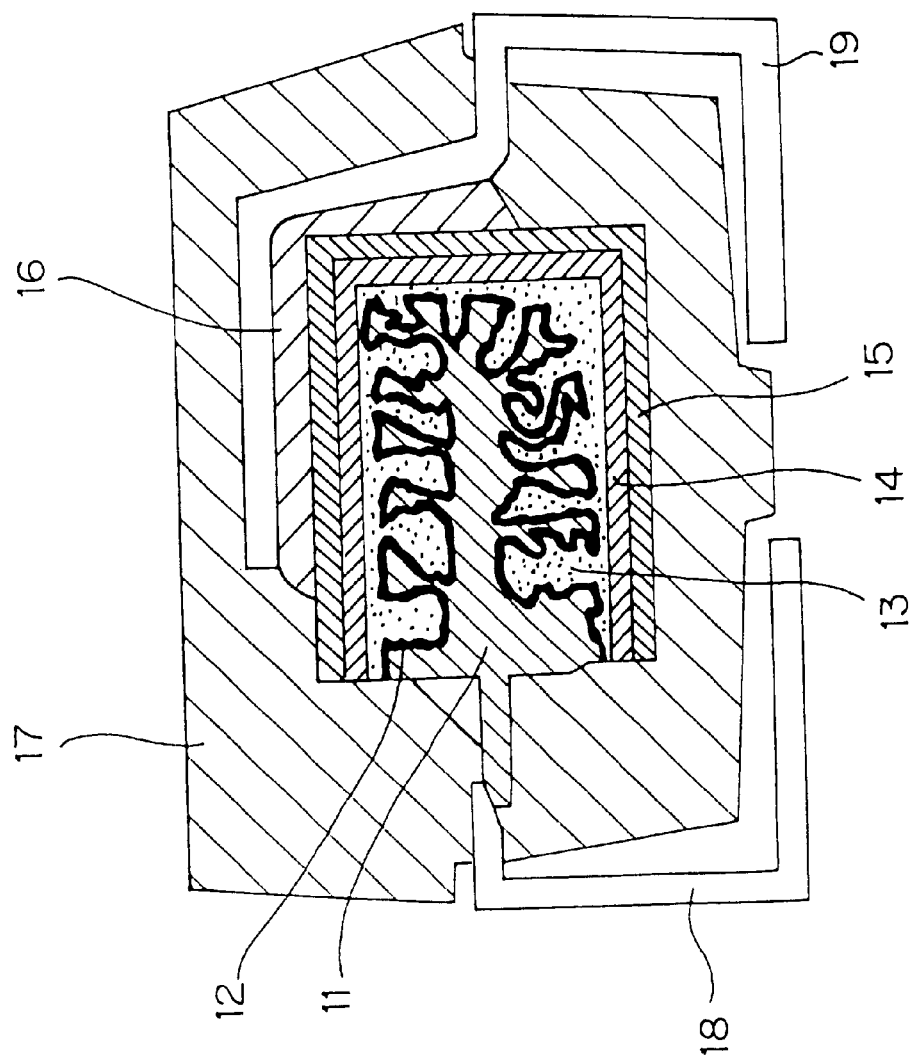
FIG. 1 is a schematic cross-sectional view of a solid electrolytic capacitor.

As shown schematically in FIG. 1, a solid electrolytic capacitor 10 has a laminated structure comprising sintered niobium 11, niobium oxide 12, a solid electrolyte 13, graphite 14 and silver 15. This solid electrolytic capacitor 10 was manufactured by sintering niobium powder in a high vacuum at about 1200° C. to form a porous sintered pellet. Subsequently, by chemical processing, the niobium oxide 12 is formed on the surface of the sintered niobium 11, and the solid electrolyte 13, graphite 14 and silver 15 are then formed. Finally, terminals are connected to the sintered niobium 11 (anode 18) and silver 15 (cathode 19), a resin mold 17 is formed, and an aging step is performed. 16 is a conducting adhesive.

Figure 2:
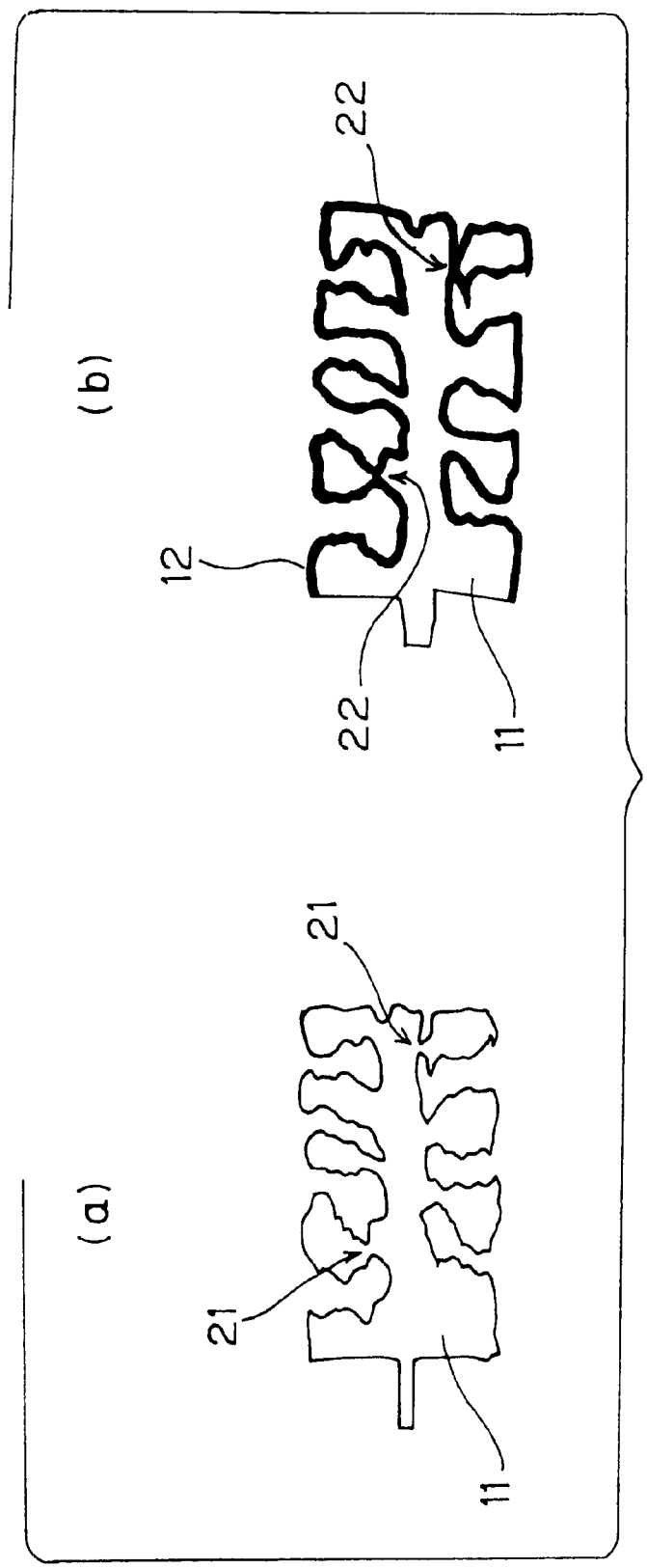
FIG. 2 is a descriptive view of a change in a niobium sintered body through a chemical processing step.

The porous body has a structure wherein branches extend from a trunk as shown in FIG. 2. When the narrow part is oxidized, it is no longer possible to form a capacitor, therefore the electrostatic capacitance falls.

FIG. 2 shows this schematically. When there is a narrow part 21 in a branched part of the porous niobium 11 as shown in FIG. 2(a), the narrow part 21 becomes niobium oxide 12 after anodic oxidation and forms an oxide part 22 wherein connections in the niobium are broken, as shown in FIG. 2(b), so the effective electrode surface area decreases.

An embodiment of this invention will now be described. The niobium powder according to this invention can be manufactured, for example, by using a plasma CVD method. Niobium powders having the desired mean particle diameter, particle size distribution and shape of primary particles can be manufactured by adjusting reaction conditions, such as supply concentrations of niobium chloride and hydrogen (reducing agent), reaction residence time and reaction temperature. 2 wt % of wax was added to the various niobium powders obtained, and after mixing thoroughly, the product compressed to predetermined dimensions using a commercial pellet press. The compressed product was then sintered in a high vacuum at a temperature of 1200° C. to manufacture an anode for an electrolytic capacitor. Subsequently, a prototype of an electrolytic capacitor was manufactured by the method know in the art, and characteristics such as electrostatic capacitance and dielectric loss tangent were measured. The values shown in Table 1 were obtained.

TABLE 1

|  | Powder characteristics | | | Capacitor characteristics | |
| --- | --- | --- | --- | --- | --- |
|  | Mean particle diameter of primary particle ($\mu$m) | Geometric standard deviation | Degree of sphericity | Electrostatic capacitance (mF) | Dielectric loss tangent (%) |
| Example 1 | 2.0 | 1.5 | 1.8 | 12.0 | 5.3 |
| Example 2 | 2.0 | 1.6 | 1.5 | 12.3 | 5.3 |
| Example 3 | 2.0 | 1.7 | 1.2 | 12.8 | 5.5 |
| Comparative Example 1 | 2.0 | 1.5 | 2.1 | 10.5 | 7.3 |
| Comparative Example 2 | 2.0 | 1.3 | 1.8 | 10.1 | 6.8 |
| Comparative Example 3 | 2.0 | 1.3 | 2.0 | 9.5 | 7.1 |
| Example 4 | 0.2 | 1.5 | 1.8 | 11.5 | 5.5 |
| Example 5 | 0.2 | 1.6 | 1.5 | 11.5 | 5.4 |
| Example 6 | 0.2 | 1.7 | 1.2 | 11.7 | 5.5 |
| Comparative Example 4 | 0.2 | 1.5 | 2.1 | 9.8 | 6.9 |
| Comparative Example 5 | 0.2 | 1.3 | 1.8 | 9.9 | 6.8 |
| Comparative Example 6 | 0.2 | 1.3 | 2.1 | 9.5 | 7.1 |
| Comparative Example 7 | 0.09 | 1.5 | 1.8 | 7.2 | 8.1 |
| Comparative Example 8 | 0.09 | 1.5 | 2.1 | 7.5 | 7.8 |
| Comparative Example 9 | 0.09 | 1.3 | 1.8 | 7.4 | 7.5 |
| Comparative Example 10 | 0.09 | 1.3 | 2.1 | 7.4 | 7.7 |
| Comparative Example 11 | 3.0 | 1.5 | 1.8 | 8.1 | 8.1 |
| Comparative Example 12 | 3.0 | 1.5 | 2.1 | 7.8 | 7.5 |
| Comparative Example 13 | 3.0 | 1.3 | 1.8 | 7.9 | 6.8 |
| Comparative Example 14 | 3.0 | 1.3 | 2.1 | 7.5 | 7.1 |

As is clear from Table 1, the electrolytic capacitor produced using a niobium powder having a particle diameter and shape according to the requirements of this invention has a high electrostatic capacitance, and its dielectric loss tangent is low. This shows that the electrode of the electrolytic capacitor manufactured using the niobium powder according to this invention has a very high porosity, its effective surface area increases, and that the total resistance of the dielectric, internal electrodes and leads, i.e., the equivalent series resistance, has decreased.

The niobium powder of this invention has a suitable particle size and particle size distribution, and outstanding shape characteristics, so a most suitable powder for an anode of a solid electrolytic capacitor can be obtained.

What is claimed is:

1. A niobium powder wherein an average particle diameter of primary particles is 0.10–2 $\mu$m, a geometric standard deviation of particle size distribution exceeds 1.4, and a degree of sphericity is 2 or less.

2. An anode for a solid electrolytic capacitor formed by sintering the niobium powder as defined in claim 1.

* * * * *